(12) United States Patent
Vacanti

(10) Patent No.: US 9,678,197 B2
(45) Date of Patent: Jun. 13, 2017

(54) FMCW RADAR WITH REFINED MEASUREMENT USING FIXED FREQUENCIES

(71) Applicant: Honeywell International Inc., Morristown, NJ (US)

(72) Inventor: David C. Vacanti, Renton, WA (US)

(73) Assignee: Honeywell International Inc., Morris Plains, NJ (US)

(*) Notice: Subject to any disclaimer, the term of this patent is extended or adjusted under 35 U.S.C. 154(b) by 525 days.

(21) Appl. No.: 14/038,414

(22) Filed: Sep. 26, 2013

(65) Prior Publication Data

US 2015/0084808 A1 Mar. 26, 2015

(51) Int. Cl.
| G01S 13/02 | (2006.01) |
| G01S 7/41 | (2006.01) |
| G01S 13/34 | (2006.01) |
| G01S 13/36 | (2006.01) |
| G01S 13/88 | (2006.01) |

(52) U.S. Cl.
CPC ............. *G01S 7/41* (2013.01); *G01S 13/02* (2013.01); *G01S 13/343* (2013.01); *G01S 13/36* (2013.01); *G01S 13/882* (2013.01)

(58) Field of Classification Search
CPC .................................. G01S 7/41; G01S 13/02
USPC ........................................................ 342/122
See application file for complete search history.

(56) References Cited

U.S. PATENT DOCUMENTS

| 4,958,161 A * | 9/1990 | Allezard ............... G01S 13/343 342/120 |
| 5,646,623 A * | 7/1997 | Walters .................. G01S 13/32 342/112 |
| 7,295,150 B2 | 11/2007 | Burlet et al. |
| 8,115,672 B2 | 2/2012 | Nouvel et al. |
| 2006/0089759 A1 | 4/2006 | Becker |
| 2012/0154234 A1* | 6/2012 | Geiler ................. H01Q 15/008 343/787 |

(Continued)

FOREIGN PATENT DOCUMENTS

| DE | 19632889 | 2/1998 |
| DE | 19935265 | 2/2001 |

(Continued)

OTHER PUBLICATIONS

Stumpf et al., "A Novel FMCW Radar Altimeter Design Capable of Achieving Fine Range Accuracy Needed for Autonomous UAV Operation", Jul. 2013, pp. 150, Publisher: University of Kansas.

(Continued)

*Primary Examiner* — Peter Bythrow
*Assistant Examiner* — Helena Seraydaryan
(74) *Attorney, Agent, or Firm* — Fogg & Powers LLC

(57) ABSTRACT

One embodiment is directed to a method for operating a radar altimeter. The method includes transmitting a radar signal at a first frequency, ramping the frequency of the radar signal from the first frequency to a second frequency, and transmitting the radar signal at the second frequency. The reflections can be processed by determining an approximate distance to a target based reflections of the frequency ramp and the approximate distance can be refined based on a phase difference between a reflection of the radar signal transmitted at the first frequency and a reflection of the radar signal transmitted at the second frequency.

17 Claims, 8 Drawing Sheets

(56) References Cited

U.S. PATENT DOCUMENTS

2013/0214963 A1    8/2013   Vacanti
2013/0214964 A1    8/2013   Holt
2014/0022113 A1*   1/2014   Nogueira-Nine ....... G01S 7/412
                                                   342/128

FOREIGN PATENT DOCUMENTS

EP    2189809    5/2010
EP    2631666    8/2013

OTHER PUBLICATIONS

European Patent Office, "Extended European Search Report from EP Application No. 14184291.4 mailed Mar. 20, 2015", "from Foreign Counterpart of U.S. Appl. No. 14/038,414", Mar. 20, 2015, pp. 18, Published in: EP.

* cited by examiner

FMCW RADAR WITH REFINED MEASUREMENT USING FIXED FREQUENCIES

BACKGROUND

A conventional frequency modulated continuous wave (FMCW) radar altimeter is limited to 200 MHz of operating bandwidth that corresponds to around 3 ft of range resolution. Such an FMCW radar operates by transmitting a chirp signal (frequency sweep) and determining a distance to a target based on the time between transmission of the chirp signal and a reception of a reflection of the chirp signal. The chirp signal is repeated to continually measure distance. The chirp signal can be a linearly increasing ramp, that is repeated, or a linearly increasing ramp followed by a linearly decreasing ramp that is repeated. Such FMCW radars can be used as altimeters in an aircraft, for example, as tail strike warning altimeters.

SUMMARY

One embodiment is directed to a method for operating a radar altimeter. The method includes transmitting a radar signal at a first frequency for a first length of time, ramping the frequency of the radar signal from the first frequency to a second frequency, and transmitting the radar signal at the second frequency for a second length of time. The method also includes receiving reflections of the radar signal and processing the reflections. The reflections can be processed by determining an approximate distance to a target from which the reflections are received based on an amount of time between transmission of the radar signal having the frequency ramp and reception of a reflection of the radar signal having the frequency ramp. A first phase of a reflection of the radar signal transmitted at the first frequency can be determined, wherein the first phase is the phase of the radar signal as received. A second phase of a reflection of the radar signal transmitted at the second frequency can also be determined, wherein the second phase is the phase of the radar signal as received. A phase difference between the first phase and the second phase can be determined and the approximate distance to the target can be refined based on the phase difference between the first phase and the second phase.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Figure 1A:
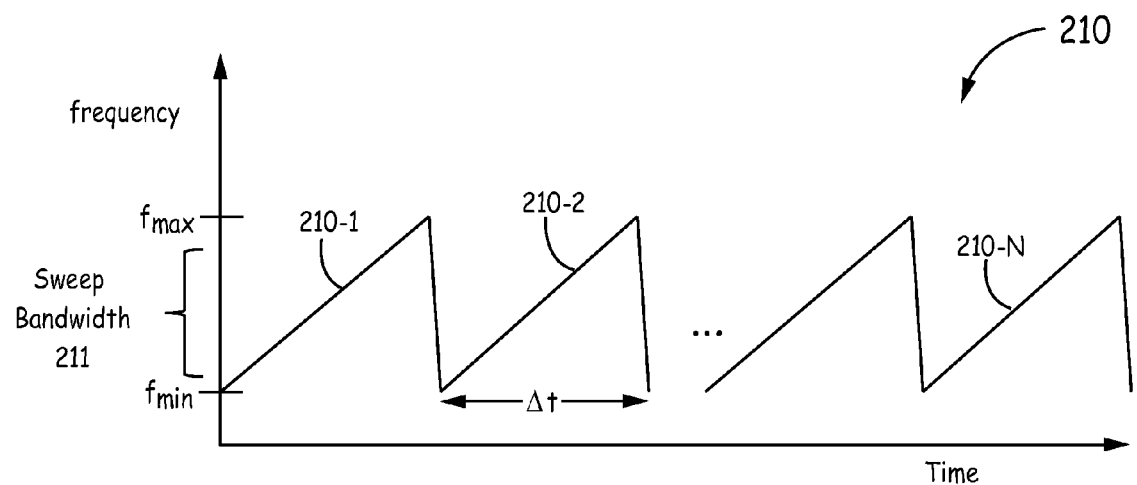
FIG. 1A is an example of a FMCW radar signal.

FIG. 1A shows an exemplary frequency modulated continuous wave (FMCW) radar signal 210 linearly ramped in frequency versus time. During FMCW operation of a radar or radio altimeter, the frequency of the radar signal 210 is repetitively swept with a linear ramp (i.e., repetitive frequency sweeps at a constant rate versus time in either a positive or negative direction). Each frequency sweep is referred to as a frequency chirp. The exemplary ramped segments of FIG. 1A, which are represented generally at 210(1-N), where N is a positive integer, range in frequency from $f_{min}$ to $f_{max}$ and are swept in a positive direction. A portion of the frequencies within a range of frequencies from $f_{min}$ to $f_{max}$ is referred to herein as the sweep bandwidth 211.

The radar signal 210 sweeps from $f_{min}$ (e.g., 4215 MHz) to $f_{max}$ (e.g., 4385 MHz) over a time $\Delta t$. This sweep is repeated during FMCW operation of the altimeter so that the radar signal 210 has a saw-tooth pattern as shown in FIG. 1A. In one implementation of this embodiment, the sweep of the radar signal 210 has a triangle pattern where the transmitted signal 210 sweeps down from $f_{max}$ to $f_{min}$ after sweeping up from $f_{min}$ to $f_{max}$.

Figure 1B:
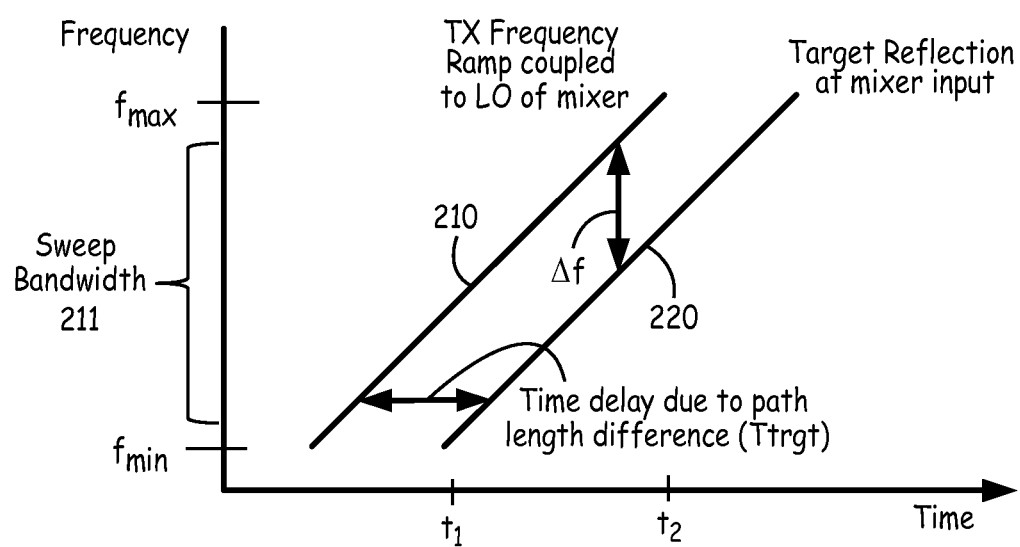
FIG. 1B is an example of a frequency sweep ramp of the FMCW radar signal of FIG. 1A.
Figure 2:
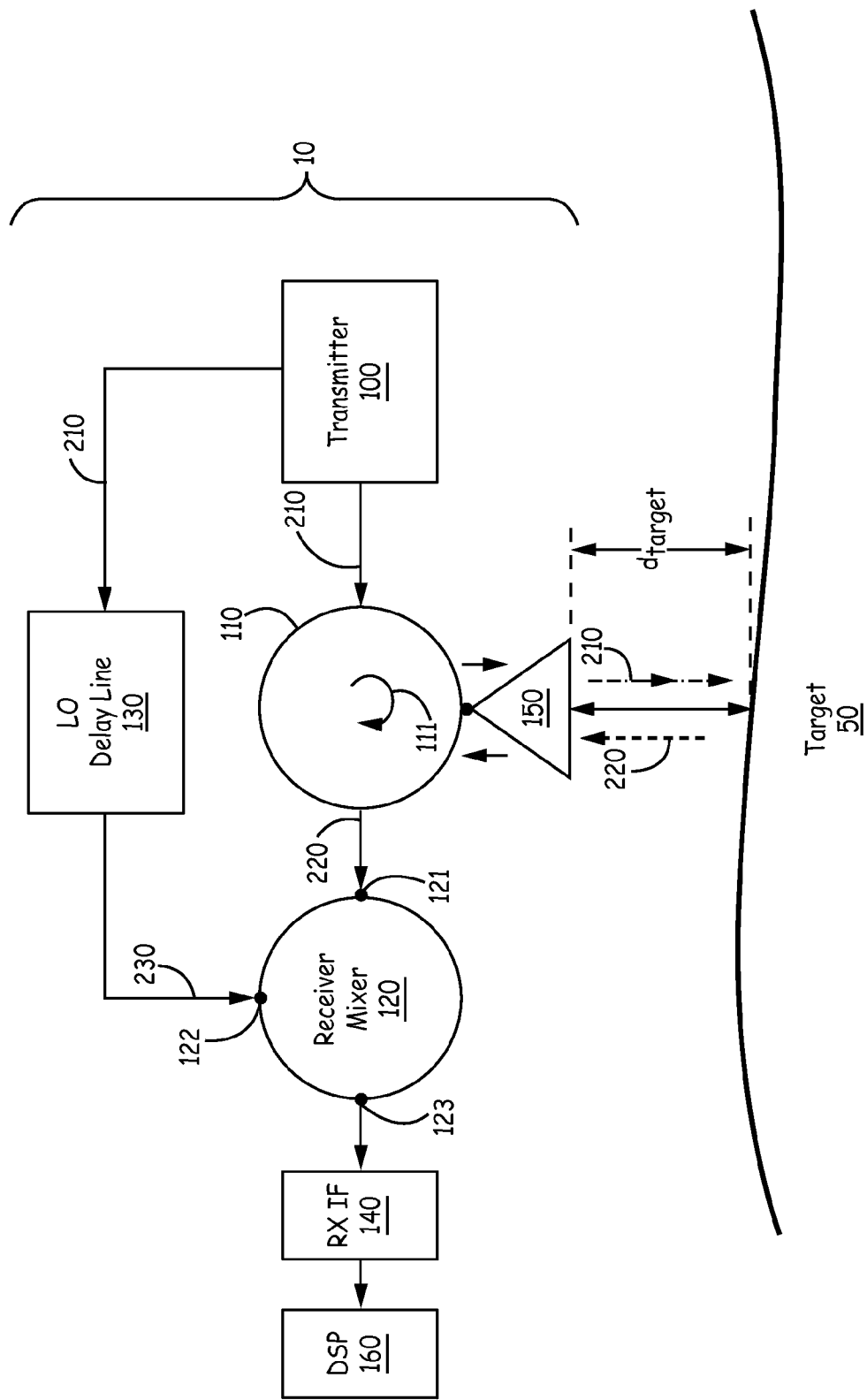
FIG. 2 is a block diagram of an example FMCW radar.

FIG. 1B shows a ramped segment of the exemplary FMCW radar signal 210 of FIG. 1A and an exemplary target-reflected signal 220. FIG. 2 is a block diagram of one embodiment of the analog portion of an altimeter system 10. The altimeter system 10 includes a transmitter 100, a transceiver circulator 110, a receiver mixer 120, a local oscillator (LO) delay line 130, a receiver intermediate frequency (IF) module 140, a single antenna 150, and a signal processor (e.g., digital signal processor (DSP)) 160. The receiver mixer 120 includes an antenna-input 121 and a local-oscillator-input 122. The transceiver circulator 110 has a directivity represented generally at 111. The antenna 150 is integrated in a common housing with the transmitter 100, the receiver mixer 120, and the receiver IF module 140. The antenna 150 is connected closely (e.g., as close as physically possible) to the circulator 110. In an example, the antenna 150 is composed of one or more resonant elements and is less than 2 cm (e.g., within 1 to 2 cm) from the circulator 110.

The radar signal 210 is generated at the transmitter 100. The radar signal 210 is directed to the antenna 150 by the transceiver circulator 110. The radar signal 210 is emitted by the antenna 150 and propagates from the antenna 150 to a target 50. At least a portion of the radar signal 210 is reflected by the target 50 as target-reflected signal 220 back to the antenna 150. The target-reflected signal 220 is received at the antenna 150 and propagates through the transceiver circulator 110 to the antenna-input 121 of receiver mixer 120. The radar signal 210 is also directed to the LO delay line 130. LO delay line 130 delays the radar signal 210 and outputs the LO signal 230 to the local-oscillator-input 122 of the receiver mixer 120.

As shown in FIG. 1B, for the range of times between $t_1$ and $t_2$, the frequency of the target-reflected signal 220 input at the antenna-input 121 of the receiver mixer 120 differs from the frequency of the local oscillator signal 230 input at the local-oscillator-input 122 of the receiver mixer 120 by a constant amount ($\Delta f$). This frequency difference equals the amount of the frequency sweep that has occurred during the time required for the radar signal 210 to travel the distance from the transmitter to the target and back to the receiver minus the LO delay time. Thus, the distance, $d_{target}$, to the target 50 from the antenna 150 is proportional to the difference frequency $\Delta f$. The output from IF-output 123 of the receiver mixer 120 is an intermediate frequency (IF) signal 245 that has a frequency equal to the frequency difference $\Delta f$. The receiver intermediate frequency (IF) module 140 processes the IF signals 245 and passes them on to a signal processor 160 to determine the distance, $d_{target}$, to the target 50.

The frequency chirp method described above can be used to determine the distance, $d_{target}$, with a resolution based on the separation of the FFT bins in the altimeter 10. In an example, the FFT bins are about 3 ft apart. This makes the frequency chirp a good means for determining the distance to the target 50 when the target 50 is farther than 3 ft away. To achieve resolution smaller than 3 ft, the radar 10 includes periods of fixed frequency transmission to refine the distance determined using the frequency chirp.

In an example, the radar 10 can first determine an approximate distance to the target 50 using the frequency chirp method described above. If it is determined that the distance to the target 50 is less than or equal to the distance of the center of the first FFT bin (e.g., 3 ft), the radar 10 uses two fixed frequency signals to determine more accurately the distance, $d_{target}$, to the target 50. In an example, where the first FFT bin is centered at 3 ft, the radar 10 can resolve to within 2-3 inches using the two fixed frequency signals.

Figure 3:
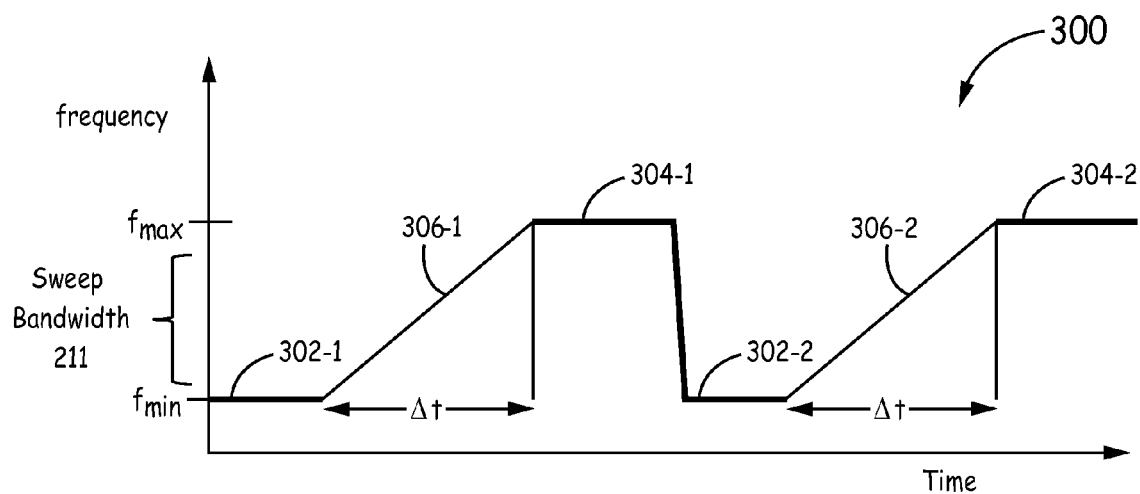
FIG. 3 is an example of a FMCW radar signal combined with fixed frequency signals.

FIG. 3 illustrates an example radar signal 300 include two fixed frequency portions for refining the distance to the target 50. First, the transmitter 100 generates a radar signal 300 having a first fixed frequency 302-1 for a first length of time. In an example, the first length of time is at least 0.5 ms and in a particular example the first length of time is 1 ms. The signal processor 160 receives a reflection of the radar signal 300 at the first fixed frequency 302-1 and passes the reflection to the signal processor 160. The signal processor 160 uses an FFT to calculate a phase angle for the reflection in the zero IF (DC) FFT bin. The zero IF FFT bin is the DC component in the FFT used to process the reflection. The phase angle can be calculated by taking the inverse tangent (ArcTAN) of the imaginary value divided by the real value (Im/Re) of the reflected signal in the zero IF FFT bin.

The transmitter 100 also generates a radar signal 300 having a second fixed frequency 304-1 for a second length of time. In an example, the second length of time is equal to the first length of time. In an example, the second length of time is at least 0.5 ms and in a particular example the second length of time is 1 ms. The receiver IF module 140 receives a reflection of the radar signal 300 at the second fixed frequency 304-1 and passes the reflection to the signal processor 160. The signal processor 160 calculates a phase angle for this reflection in the zero IF (DC) FFT bin. Again, the phase angle can be calculated by taking the inverse tangent (ArcTAN) of the imaginary value divided by the real value (Im/Re) of the reflected signal in the zero IF FFT bin. The signal processor 160 then calculates a phase difference (the absolute difference) between the phase angle of the reflection of the radar signal 300 at the first fixed frequency 302-1 and the phase angle of the reflection of the radar signal 300 at the second fixed frequency 304-1. This phase difference is an angle between zero and 360 degrees. The phase difference is linearly proportional to the distance to the target 50. In particular, the phase difference is related to the distance to the target based on the difference in frequency between the frequency used for the first fixed frequency transmission 302-1 and the frequency used for the second fixed frequency transmission 304-1. The phase difference can be translated to distance according to the equation: the phase difference (in degrees) divided by 360 degrees and multiplied by the maximum unambiguous distance is equal to the distance, where the maximum unambiguous distance that can be measured is based on the frequency separation of the first frequency and second frequency. The maximum unambiguous distance that can be measured with the differential phase (fixed frequency) equals the speed of light, c, divided by two times the frequency difference between the first frequency and the second frequency. In an example, the first frequency is $f_{min}$ (e.g., 4215 MHz) and the second frequency is $f_{max}$ (e.g., 4385 MHz), which corresponds to about a 3 ft maximum unambiguous distance. In such an example, zero degrees corresponds to 0 ft. and 360 degrees corresponds to 3 ft. with each degree between 0 and 360 corresponding linearly to a distance between 0 and 3 ft. Accordingly, if the phase difference is close to zero degrees, the distance within the distance range will be close to zero. If the phase difference is closer to 360 degrees the distance within the distance range will be close to the maximum unambiguous distance (e.g., 3 ft). The phase difference, therefore, can be used to sub-resolve the distance to the target 50 to less than 3 ft.

In an example, the distance determined by the frequency chirp method is refined using the two fixed frequency transmissions whenever the frequency chirp method determines that the distance is less than or equal the distance of the center of the first FFT bin (e.g., 3 ft). In such an example, the radar 10 determines using the frequency chirp method whether the distance to the target 50 is less than or equal to the distance corresponding to the center of the first FFT bin. If the distance to the target 50 is less than or equal to the distance corresponding to the center of the first FFT bin, the radar 10 performs the fixed frequency transmission method to refine the distance as described above. If the distance to the target 50 is greater than the distance corresponding to the center of the first FFT bin (e.g., is larger than 3 ft.), the radar 10 does not refine the distance using the fixed frequency transmission. Such a method of selectively refining the distance can be useful if the radar 10 is a tail strike altimeter for an aircraft. In such instances, the frequency chirp method can be used without the fixed frequency transmission method to determine the distance to the target 50 with a lower resolution, while the tail of the aircraft is farther away from the ground (the target 50). If the tail of the aircraft moves close to the ground (the target 50), the radar 10 can refine the distance measurement to provide higher resolution. In this way, the aircraft controls can obtain a more precise altitude measurement when the tail is closer to the ground when the measurement precision becomes more critical.

In some examples, the frequency chirp is performed in between the first fixed frequency transmission and the second fixed frequency transmission. An example radar signal 300 including such a frequency sweep combined with fixed frequency is shown in FIG. 3. In particular, the transmitter 100 can generate a radar signal 300 at the first fixed frequency 302-1 for the first length of time, then generate the radar signal 300 according to the frequency sweep 306-1 of the frequency chirp, and then generate the radar signal 300 at the second fixed frequency 304-1 for the second length of time. The first fixed frequency can be a frequency at or near the starting frequency of the frequency sweep for the frequency chirp and the second fixed frequency can be a frequency at or near the ending frequency of the frequency sweep for the frequency chirp. With reference to frequency sweeps shown in FIG. 1A, the first fixed frequency can be selected as $f_{min}$ (e.g., 4215 MHz) and the second fixed frequency can be selected as $f_{max}$ (e.g., 4385 MHz). Moreover, the frequency sweep of the frequency chirp can begin immediately after transmission of the first fixed frequency for the first length of time and transmission of the second fixed frequency can begin immediately after the end of the frequency sweep. In this way, the radar signal 300 can transition smoothly between the first fixed frequency 302-1, the frequency sweep 306-1 and the second fixed frequency 304-1. The combined fixed frequency and the frequency chirp can be performed periodically, such as for each frequency chirp as shown in FIG. 3.

In an example, the radar 10 can operate in two modes, a first mode for distances farther from the target 50, and a second mode for distances closer to the target 50. In the first mode, the radar 10 transmits and determines the distance using the frequency chirp without the fixed frequency transmissions, for example, the radar signal 210 shown in FIG. 1A. In the second mode, the radar 10 transmits and determines the distance using both the frequency chirp and the fixed frequency transmission, such as the radar signal 300 having the frequency sweep between the fixed frequency transmissions shown in FIG. 3. The radar 10 can switch between the first and second mode based on the current distance (e.g., last measured distance) to the target 50, such as operating in the second mode when the distance is below a threshold (e.g., 9 ft.) and operating in the first mode when the distance is above the threshold.

In an example, the radar 10 comprises a single antenna 150 that is integrated in a housing with the transmitter 100, the receiver mixer 120, and the receiver IF module 140. Using a single antenna 150 integrated with the transmitter 100, receiver mixer 120, and the receiver IF module 140 enables the antenna 150 to be located very close in the signal path to the circulator 110. With the antenna 150 close to the circulator 110, the signal processor 160 can directly measure relative phase between the reflection of the radar signal at the first fixed frequency and the reflection of the radar signal at the second fixed frequency. This is a measure of the number of wavelengths to the target 50 at the two frequencies. Since the antenna 150 is close to the circulator 110 there is little delay between the transmit and reflection signals attributed to propagation between the antenna 150 and the circulator 110 (or more precisely between the antenna 150 and the transmitter 100/receiver mixer 120). Moreover, the delay that is present is consistent and known at the time of manufacture since the antenna 150 is integrated into the housing with the transmitter 100, receiver mixer 120, and receiver IF module 140. Therefore, the delay of the reflection at the receiver IF module 140 is attributed almost entirely to the time of propagation between the antenna 150 and the target 50, and any delay between the antenna 150 and the transmitter 100/receiver mixer 120 can be accurately accounted for. This is possible because the LO signal 230 has been made to arrive at 122 at a time that corresponds to the time from transmitter 100 through circulator 110 to antenna 150 and back from antenna 150 (without leaving the assembly) to the receiver mixer at 121. This offset delay automatically subtracts the internal delays of the radar transmitter 100 and receiver such that the only time delay measured is from the antenna 150 to the target (e.g., ground) 50 and return. This enables a highly accurate low distance measurement to be made with the radar 10. It is more difficult or impossible to perform such an accurate low distance measurement using the techniques above in radar systems in which the antenna is coupled via a length of coaxial cable to the transmitter/receiver. In such radar systems, there is a relatively larger delay between the transmitter/receiver and the antenna, and the amount of the delay is typically unknown at the time of manufacture since the length of coaxial cable is typically unknown until the antenna and transmitter/receiver are installed (e.g., in an aircraft). Such a method described above would not be possible with a conventional dual antenna radar altimeter, because such dual antenna radar altimeters have an unknown delay of the reflection signal due to the unknown length of the coaxial cable between the antenna module and the transceiver module. Because of this unknown delay, the measurement of distance between the antenna and the target is computed at an unknown FFT bin that is determined by the overall system delay comprised of the internal transmitter and receiver delays along with the coax delay and the electrical lengths of the two antennas. In contrast, the method described above is possible using the radar altimeter 10 described herein in which a single antenna 150 is integrated into a housing with the transceiver electronics including the circulator 110, transmitter 100, receiver mixer 120, and LO delay line 130.

Figure 4:
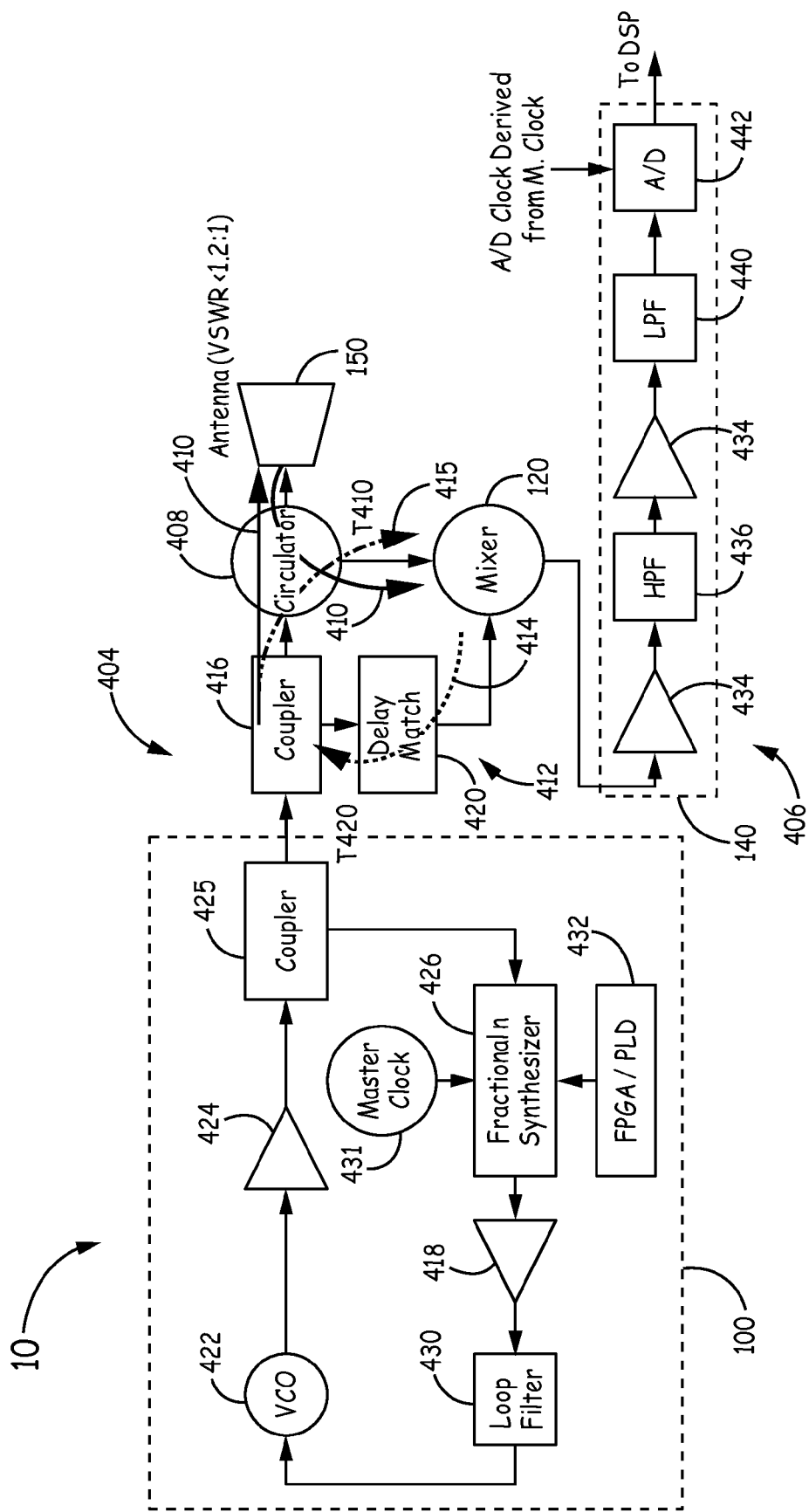
FIG. 4 is another block diagram of the example FMCW radar of FIG. 2.

FIG. 4 is a block diagram of an example of such an FMCW radar 10 having a single integrated antenna 150. The FMCW radar 10 can transmit and receive from a single antenna 150 with high sensitivity. A circulator 110 couples a transmit path 404 and a receive path 406 to the antenna 150 and provides some isolation of the receive path 406 from the transmit path 404. In an example, the circulator 110 is a conventional circulator commercially available and provides at least 20 dB of isolation from the output of the coupler 416 (from the transmit path 404) to the input of the receiver mixer 120 (toward the receive path 406).

Although the circulator 110 provides isolation for signals from the transmit path 404 leaking directly into the receive path 406, the circulator 110 does not protect against signals from the transmit path 404 that are reflected off of the single antenna 150. This reflected signal 110 is received at the port of the circulator 110 that is coupled to the antenna 150. The signal received by the antenna (also referred to herein as "the received signal") is also received at this port of the circulator 110. The circulator 110 allows both the reflected signal 110 and the received signal to pass through to the receive path 406.

The phase noise from this reflected signal 110 can increase the noise in the receive path 406. Accordingly, this reflected signal 110 is a concern for the FMCW radar 10 because large amplitude reflections 110 can cause the continuously transmitting FMCW signal to jam the receiver, thereby limiting sensitivity. To address these reflections 110, the antenna 150 has a low reflection level from the transmit path 404 (at least 20 dB below the incident level), a transmitter power level (e.g., amplifier 424) that is less than 23 dBm, and low phase noise from the transmitter (better than −120 dBc/Hz at 100 KHz offset). The magnitude of the reflection from the antenna 150 is less than or equal to the isolation level of the circulator 110. The magnitude of the reflection from the antenna 150 is known by two terms voltage standing wave ratio (VSWR) and return loss. If the circulator 110 has 20 dB of isolation, than the return loss should be 20 dB or greater. Thus, the reflected power level will be at least 20 dB below the incident power level. In an example, the VSWR of the antenna 150 is less than 1.2 to 1.

The transmitter power level, that is, the power level of the amplifier 424, is controlled such that the power level of the FMCW signal in the transmit path 404 is less than 23 dBm.

Signals in the transmit path 404 having too high of power may cause too much power to reach the mixer 120 in the receive path 406 due to the limited isolation of the circulator 110 and the reflection level from a realizable antenna 150 (return loss of greater than 20 dB, VSWR<1.2:1). The FMCW radar 10 also addresses the phase noise of the transmitter as discussed in more detail below.

Phase noise in the received signal can also be obtained from a leakage signal 415 due to the limited isolation of the circulator 110 between the transmit path 404 and the receive path 406. The leakage signal 415 leaks through the circulator 110 from the transmit path 404 into the receive path 406. Because the leakage signal 415 may be of the same order of magnitude as the reflected signal 110, the phase noise of the transmitter contributed by the leakage path would also cause severe reduction in sensitivity of the receiver.

The noise from the reflected signal 110 and the leakage signal 415 in the FMCW radar 10 can also be limited by using a delay match path 412. The delay match path 412 uses a reference signal (also referred to herein as the "local oscillator reference signal 414") to cancel transmitter phase noise from the reflected signal 410 and the leakage signal 415 that would otherwise be converted into noise in the receive path 406 and reduce sensitivity. The local oscillator reference signal 414 is a portion of the signal from the transmit path 404 that is coupled into the delay match path 412 by a coupler 416. This local oscillator reference signal 414 is provided to a mixer 120 along with the signals arriving from the antenna 150. The mixer 120 effectively subtracts the local oscillator reference signal 414 from the signals arriving form the antenna 150. In order to cancel the phase noise from the reflected signal 410 and the leakage signal 415, the propagation time (T420) of the local oscillator reference signal 414 from the coupler 416 to the mixer 120 through the delay path 412 is set based on the propagation time (T410) of the reflected signal 410 from the coupler 416 off of the antenna 150 and to the mixer 120. The propagation time (T410) of the reflected signal 410 is based on the distance from the coupler 416 to the antenna 150 and from the antenna 150 to the mixer 120. Thus, the propagation time (T410) is based on the physical length of the path of the electrical signal through the corresponding elements and connecting transmission lines of the FMCW radar 10.

In addition, the propagation time (T410) of the reflected signal 410 is also based on the propagation speed of the signals as they are reflected from the antenna 150. In an example, the antenna 150 is selected to have desirable group delay characteristics. Group delay refers to the propagation speed of signals at different frequencies as those signals reflect off of the antenna 150. In particular, many antennas have different propagation speeds for signals of different frequencies. In such antennas having differing propagation speeds, it may be more difficult to cancel out the reflected signal 410, since different frequencies within the reflected signal 410 are in different alignment from where they were in the transmit path 404. Moreover, many of the antennas have a non-linear relationship between propagation speed and frequency, adding to the difficulty of cancellation. Essentially large variations in group delay of the antenna 150 are observed as large variations in the delay time of the reflected signal 410. If these large variations were present the delay path would provide cancellation in the mixer 120 for the portion of the time when the group delay affected reflected signal 410 remained constant. Where it deviated (became shorter or longer) the cancellation effectiveness is degraded. Thus, even if the delay path 412 is provided it is difficult to deal with large variation in group delay. In order to aid in the cancellation of phase noise from the reflected signal 410, the antenna 150 is selected to have a sufficiently flat group delay over the frequencies in the reflected signals 410, typically on the order of +/−1 nSec. In an example, the antenna has a substantially flat group delay over the entire swept bandwidth of the transmitted FMCW signal.

In an example, the propagation time (T420) of the delay match path 414 is set to be between the propagation time (T410) of the reflected signal 410 and the propagation time of the leakage signal 415. In particular, within the range between the propagation time (T410) of the reflected signal 410 and the propagation time of the leakage signal 415, the propagation time (T420) of the delay match path 414 can be set closer to the propagation time of the signal (reflected or leakage) that is stronger in the receive path 406. The stronger one of the signals (reflected or leakage) is relative to the other can determine how close the propagation time (T420) of the delay match path 414 is set to the propagation time of that signal.

In order to set the propagation time (T420) of the local oscillator reference signal 414, the delay match path 412 includes a delay element 420 to provide a set delay to the local oscillator reference signal 414. The mixer 120 is configured to combine the local oscillator reference signal 414 with the signal from the circulator 110 (which includes the reflected signal 410). In an example the delay element 420 comprises a propagation path having a length that is substantially equal to the set delay in seconds multiplied by the propagation speed of the local oscillator reference signal 414. Accordingly, the set delay can be configured by adjusting the length of the propagation path of the delay path 412. In an example, the delay element 420 can be configured such that the distance of the delay match path 412 is within 0.05 meters of the distance from the coupler 416 to the antenna 150 and then to the mixer 416. As the difference in length between the two paths decreases the phase noise cancellation increases.

In an example, the coupler 416 is a hybrid coupler such that a signal reflected from the circulator 110 is terminated in a load. The physical length of the electrical path for the leakage signal 415 is shorter than for the reflected signal 410. Thus, the electrical length of the reflected signal 410 is kept short (e.g., as short as possible) in order to reduce the difference between the length of the leakage signal 415 and the length of the reflective signal 410. To reduce the length of the reflected signal 410, the antenna 150 is connected closely (e.g., as closely as physically possible) to the circulator 110. In particular, the antenna 150 cannot be remotely located from the circulator 110 or the overall benefit of the system (increased sensitivity) will be impaired. In an example, the antenna 150 is composed of one or more resonant elements and is within 1 to 2 cm of the circulator 110. The closer the antenna 150 is to the coupler 416, the less delay that is needed by the delay element 420.

The transmit path 404 of the FMCW radar 10 generates a FMCW linear ramp signal to be propagated from the radar 10. The FMCW linear signal can ramp (e.g., an increasing ramp) in frequency over time from a starting frequency to an ending frequency. Upon reaching the ending frequency, the FMCW linear signal can return to the starting frequency in order to repeat the ramp. In some examples the return to the starting frequency can be a ramp (e.g., a decreasing ramp) at the same rate as the ramp from the starting frequency to the ending frequency. In other examples, however, the return to the starting frequency can be a very short ramp, such as a ramp taking 1% of the time of the normal ramp period 210-1 or 306-1. In any case, the FMCW linear signal can include a repeating linear ramp from a starting frequency to an ending frequency. The more linear the ramp, the better the signal to noise ratio and the better the range resolution. If the ramp has non-linear errors, radar sensitivity decreases due to spectral spreading in the receiver causing both resolution and signal to noise ratio to degrade. As known, this repeating FMCW linear ramp signal can be used in a radar for determining a distance to an object off of which the FMCW linear ramp signal reflects.

The FMCW signal may be generated using a voltage controller oscillator (VCO) 422 and a transmit amplifier 424. The VCO 422 is controlled by a phase-locked loop (PLL). The PLL may include a fractional-n synthesizer 426 to control the VCO 422. The fractional-n synthesizer comprises an integrated circuit (IC) chip that meets or exceeds all performance minimums listed herein. It is also possible to use either a phase lock loop and a Direct Digital Synthesizer (DDS) to generate the FMCW signal or an I/Q pair of DDS to vector modulate a fixed carrier produced by a VCO within a phase lock loop or by a fixed tuned Dielectric Resonator Oscillator (DRO). Regardless of the method used to achieve the FMCW waveform, performance minimums are required as indicated herein. The performance minimums include that the fractional-n synthesizer 426 have a phase detector frequency of at least 100 MHz. Accordingly, during operation the phase detector frequency of the fractional-n synthesizer 426 is set to 100 MHz or greater. In an example, the phase detector frequency of the synthesizer is set to 160 MHz. The performance minimums also include that the master clock 431 has a phase noise equal to or better than −150 dBc/Hz at 100 kHz offset. The PLL (or any form of the FMCW modulator) should use the lowest possible ratio for frequency division up to a phase detector frequency of 160 MHz. Phase noise increases at the rate of 20 Log(Divide Ratio). For example, if the reference frequency is 160 MHz, that corresponds to a division ratio of 4300 MHz/160 MHz=26.875. The phase noise that starts at the master oscillator at −150 dBc/Hz is degraded by 20 log (26.875)=28.59 dB. The phase noise rises from −150 dBc/Hz to −150+28.59=121.41 dBc/Hz. If the reference frequency is reduced to 100 MHz, then the divide ratio is 4300/100=43. 20 log(43)=32.66 dB, which means the master oscillator −150 dBc/Hz+32.66=117 dBc/Hz. In any case, the performance minimums included that the frequency division is 43 and the lowest reference frequency is 100 MHz. Any form of modulator used to generate the FMCW must meet the phase noise criterion of no worse than −120 dBc/Hz at 100 KHz offset.

The performance minimums include that a frequency step size applied by the fractional-n synthesizer 426 is sufficiently small, on the order to 100 KHz, to not cause spectral sidebands in the Fourier Transform used to derive the altitude frequency bins. The PLL loop filter then provides smoothing of these frequency steps. Thus, the loop bandwidth of the PLL is on the order of less than 100 KHz, which is less than the frequency step size. In an example, the performance minimums include that the fractional-n synthesizer 426 provide means to synthesize the desired frequency sweep bandwidth of the radar signal in response to commands issued by a processing device 432, (e.g., an FPGA/PLD). The fractional-n-synthesizer 426 is commanded by the processing device 432 to set the starting frequency, ending frequency, and step-size required to achieve the desired frequency sweep bandwidth in the desired ramp period and maintain the FMCW linear ramp signal within the desired range. An example fractional-n synthesizer 426 that meets the performance minimums is the dual mode fractional-n/integer-n synthesizer ADF4159 from Analog Devices.

In an example, the PLL can also include a separate amplifier 428 and a loop filter 430 to generate the tuning control signal for the VCO 422 from the output of the fractional-n synthesizer 426. In another example, the amplifier 428 and loop filter 430 are not used if the charge pump of the fractional-n synthesizer 426 can drive the VCO 422 directly and include loop filter components in conjunction with the charge pump output.

The fractional-n synthesizer 426 implements a FMCW linear signal (waveform) by scheduling a small fixed frequency step to be added to or subtracted from the starting frequency until the ending frequency is reached. The fractional-n synthesizer 426 does not use a phase accumulator as in direct digital synthesis (DDS) architectures. The ramp for the signal is implemented by performing linear steps.

In an example, the output of the transmit amplifier 424 is a linear frequency sweep of 200 MHz modulated bandwidth between 4200-4400 MHz. The output of the VCO 422 can be tuned at least 200 MHz centered about 4300 MHz.

The receive path 406 of the radar 10 includes the mixer 120 as previously mentioned. The receive path 406 also includes an amplifier 434, high pass filter 436, another amplifier 438, low pass filter 440, and an analog to digital converter 442 to process the received signal. In another example, a matching network is used to reduce the reflected power from the antenna 150 to go back towards the circulator 110 and be passed to the mixer 120. After being processed in the receive path 406, the received signal is provided to a processing device such as a digital signal processor (DSP). The frequency difference generated by the mixer 120 is provided to the HPF 136, which filters the received analog signal according to a 6 dB per octave slope of gain versus frequency before the received signal is passed to the band limiting low pass filter 440. The 6 dB per octave slope is used in examples when radar 10 is configured as a radar altimeter. In other examples, the radar 10 is configured as a target detection radar and uses a slope of 12 dB per octave. In yet other examples, the radar 10 is configured as a weather or precipitation radar and uses a 9 dB per octave slope. This high pass filter compensates directly for the propagation losses over the distance transmitted and reflective signal travel. After the filter, a signal reflected from a fixed size target appears to have the same amplitude at all ranges. Then the received signal is sent to the A/D 142. The digital output of the A/D 142 is sent to a DSP which processes the digital output as described below. In an example, the clock signal for the A/D 142 is derived from the master clock 431. In this way, the clock signal for the A/D 442 is of low phase noise with resulting low jitter to ensure that the signal to noise ratio at the input to the A/D 442 is not degraded by phase noise of the clock signal. The clock signal is also coherent with the radar synthesis system. By using the master clock 431 as the source of the A/D clock signal the A/D conversion process is performed coherently. The clock signal for the A/D 442 cannot be generated by any other independent means such as by a DSP clock system or a clock system of the processing device 432 (e.g., an FPGA/PLD). The processing device 432, however, may be used to divide the frequency of the master clock 431 to the value used to drive the A/D 442, but the processing device 432 must not use an external FPGA clock in any way to accomplish the frequency division.

Figure 5:
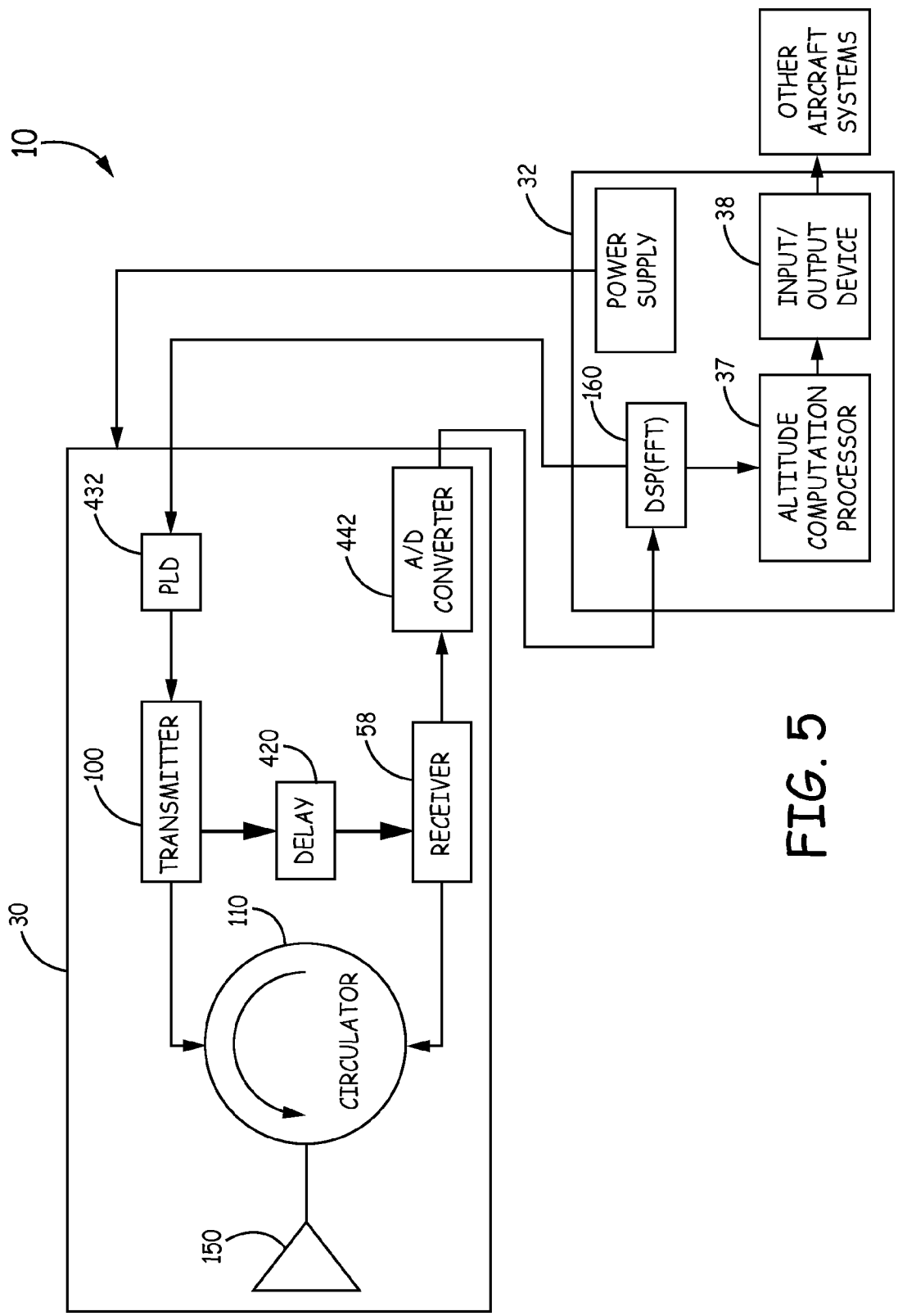
FIG. 5 is yet another block diagram of the example FMCW radar of FIG. 2.

FIG. 5 is an example radar altimeter system 10. The system 10 can provide accurate radar altimeter measurements and tail strike warnings. The radar system 10 includes a transmitter/receiver 30 and a signal processing system 32. The signal processing system 32 includes a processor 160, an altitude computation processor (ACP) 37 and an input/output device 38. In one embodiment, the processor 160 is a digital signal processor (DSP) or a field programmable gate array (FPGA) that is configured to perform Fast Fourier Transform (FFT). The transmitter/receiver 30 is in signal communication with the signal processing system 32 and other aircraft systems, such as a ground-proximity warning system. The transmitter/receiver 30 sends data received from the A/D 442 to the processor 160, which in turn transforms the data to frequency bin data and provides it to the ACP 37. The ACP 37 analyzes the frequency bin data to determine distance to ground values. The ACP 37 can generate a tail strike warnings based on the distance to ground values. If the ACP 37 produces a tail strike warning, the input/output device 38 may present a warning to the flight crew in addition to reporting the actual distance to the ground. The transmitter 100 shown in FIG. 5 includes components of the transmit path 404 such as the VCO 422, transmit amplifier 424, coupler 425, and the fractional-n synthesizer 426. The receiver 58 of FIG. 5 includes components of the receive path 406 such as the receiver mixer 120 and receiver IF module 140 (amplifier 434, high pass filter 436, amplifier 438, and low pass filter 440). As discussed above, the transmitter/receiver 30 also includes a delay match path with a delay element 420 to cancel out most or all phase noise contained within a reflected signal 410 and the leakage signal 415 in the receiver mixer 120 before the desired delayed target reflection signals are processed by the receiver 58.

The DSP 160 can send a control signal to the processing device 432 which converts the control signal from the DSP 160 into commands for the fractional-n synthesizer 426 or other digitally controlled modulator which translates into a linear frequency ramp of a particular bandwidth and period for the FMCW signal. The DSP 160 can also send control signals for calibration or self-test of the radar 10. For the received signals, the DSP 160 receives the digital output of sampled data from the A/D 442. The DSP 160 computes Fast Fourier Transforms (FFT) of the sampled data. The resulting frequency bins of the FFT correspond to incremental altitude bins. The ACP 37 uses algorithms to evaluate the altitude frequency bins to determine the aircraft height above the ground. Those algorithms may also determine if the potential exists for a tail strike during take off and report that information via the Input/Output Device 38 to other aircraft systems such as the flight controls.

Figure 6:
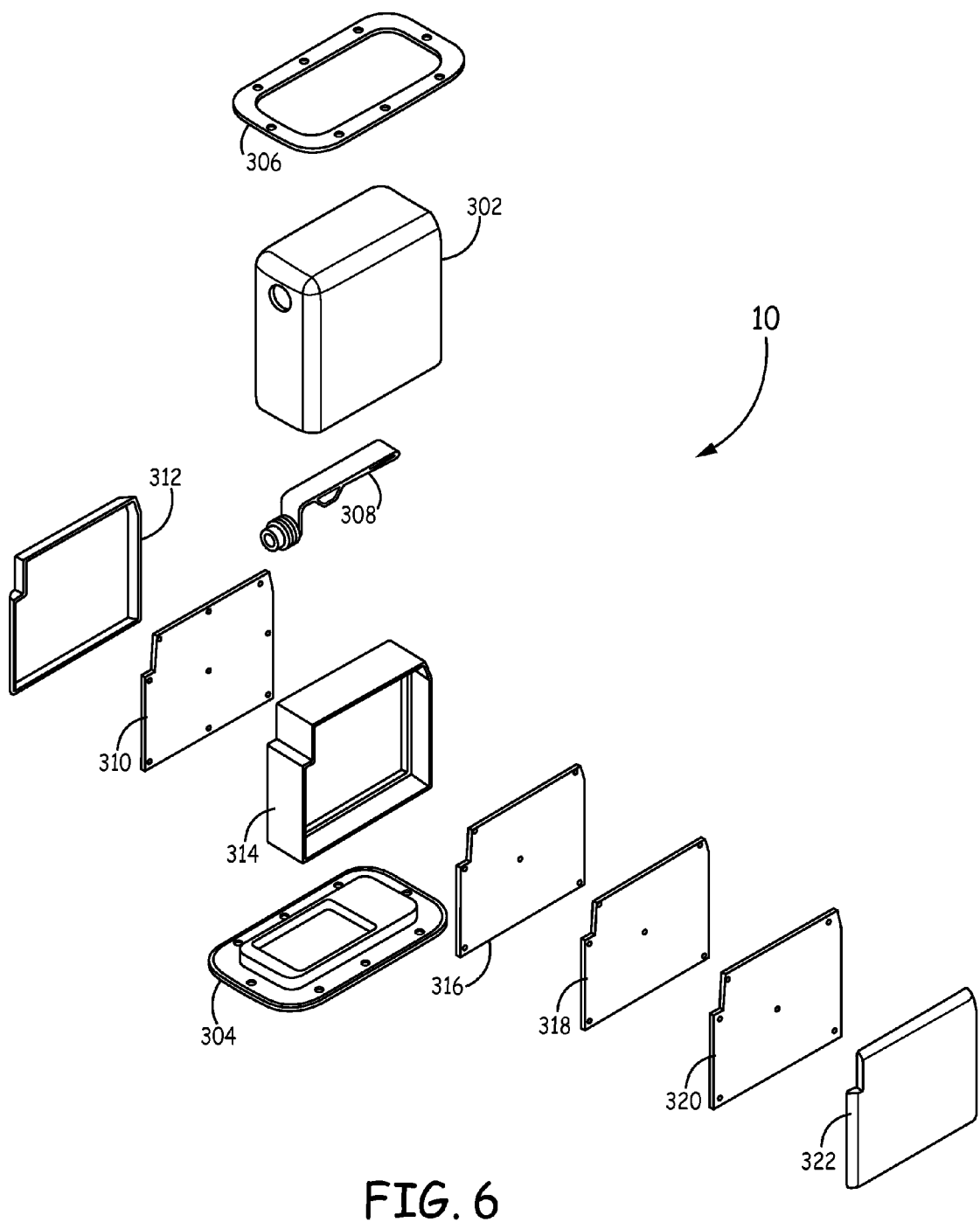
FIG. 6 is an exploded view of the radar altimeter system of FIG. 5.
Figure 7:
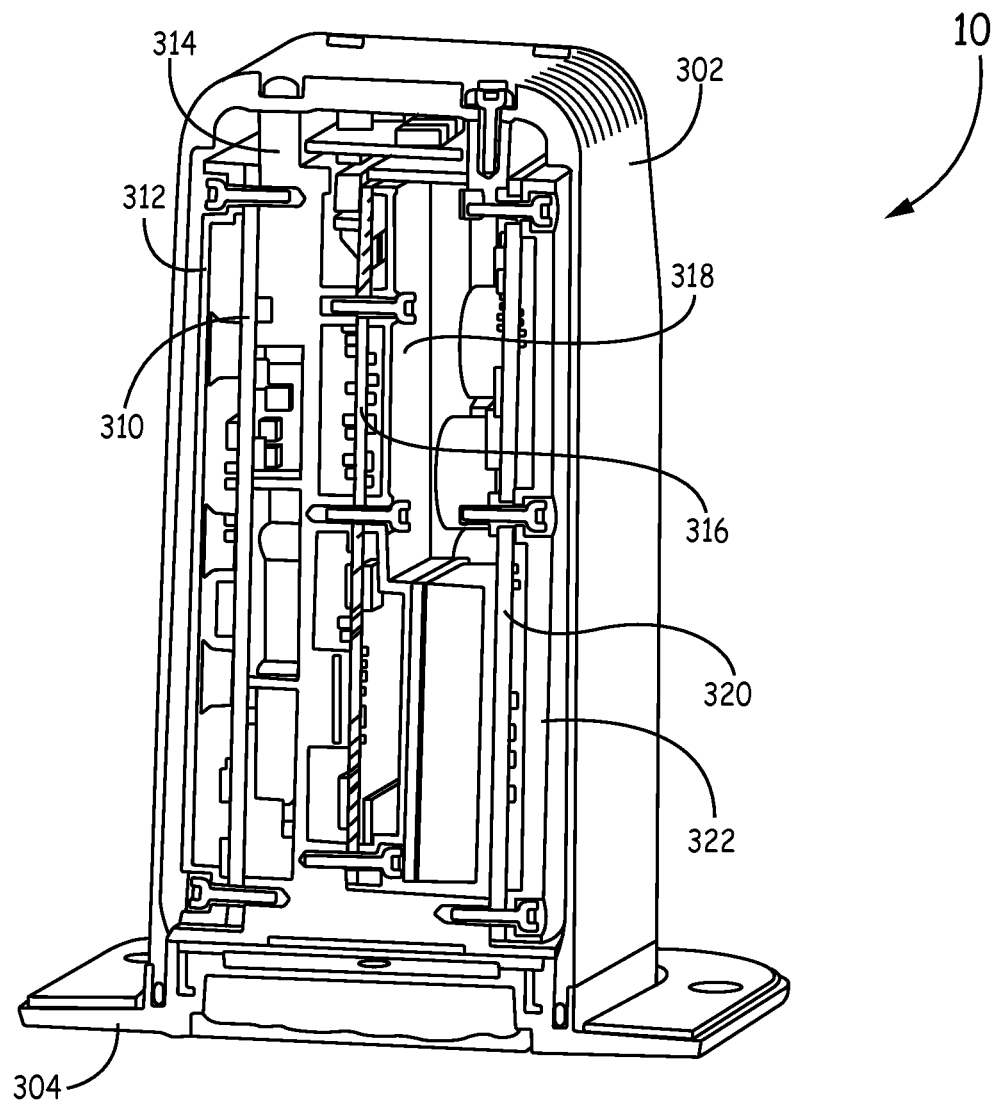
FIG. 7 is a cut-away view of the radar altimeter system of FIG. 5.

FIGS. 6 and 7 illustrate an example physical implementation of the radar altimeter system 10. FIG. 6 is an exploded view of the radar altimeter system 10. As shown the system 30 includes an outer housing 302 that can protect the electronics from the external environment. The outer housing 302 mounts to an antenna cover 304 which includes the antenna 150. The antenna cover 304 can be configured to mount to the outside of the aircraft skin. An input/output interconnect 308 is configured to fit primarily within the outer housing 302 and extend through an aperture in the outer housing 302 to enable interconnect with external systems. The connector 308 contains only power supply, and digital and analog signals used to control and monitor performance of the altimeter.

The electrical components of the radar altimeter system 30 are contained within the outer housing 302 and are mounted on three adjacent circuit boards. An RF circuit board 310 includes the analog and digital RF components of the transmitter and receiver. The RF circuit board 310 is coupled to the antenna 150 via a blind mate connector for transmission and reception of signals. A first cover 312 provides isolation for the analog and digital (e.g., the fractional-N-synthesizer) RF components on the RF circuit board 310. The RF circuit board 310 is mounted to a first side of a structural backbone 314 which is mounted to the antenna cover 304 and provides support and further isolation for the RF circuit board 310. The RF circuit board 310 includes components such as the fractional-n synthesizer 426, the transmit amplifier 424, the processing device 432, the master clock 431, and the A/D 442.

Mounted to the opposite side of the structural backbone 314 from the RF circuit board 310 is a digital circuit board 316. The digital circuit board 316 includes digital components such as the DSP, Memory and Input/Output Devices. The digital circuit board 316 is isolated by the structural backbone 314 and a second cover 318. On the opposite side of the second cover 318 from the digital circuit board 316 is a power supply board 320. The power supply board 320 is isolated by the second cover 318 and a third cover 322. Each of the third cover 322, power supply board 320, second cover 318, and digital circuit board 316 are a planar structure. The planar structures are disposed parallel and adjacent to one another and mounted to a second side of the structural backbone 314 such that the sides of each planar structure are facing the sides of the neighboring planar structure. Similarly, the RF circuit board 310 and the first cover 312 are also planar structures that are disposed parallel and adjacent to one another and mounted to the first side of the structure backbone 314 such that a side of the first cover 312 is facing a side of the RF circuit board 310.

FIG. 7 is a cut-away view of the radar altimeter system 10. As shown, the outer housing 302 is mounted to the antenna cover 304 which together enclose the electronic components. Inside the outer housing 302, the structural backbone 314 is mounted to the antenna cover 304 and to a portion of the outer housing 302. The first cover 312 and RF circuit board 310 are mounted to a first side of the structural backbone 314. The third cover 322, power supply circuit board 320, second cover 318, and digital circuit board 316 are mounted to a second and opposite side of the structural backbone 314. The assembled radar altimeter system 30 is configured to mount to another member via the antenna cover 304 attaching to the other member.

Advantageously, the physical design described with respect to FIGS. 6 and 7 is important to achieving the desired performance because it enables a short connection distance between the circulator 110 and the antenna 150. While it may be possible to implement a printed antenna on one side of a printed circuit board and the transmitter and receiver circuitry on the back side of a circuit board to provide intimate integration and minimal distance between the circulator and the antenna, this configuration does not allow the unit to be easily packaged for pressure differential (outside to inside an aircraft which can be 30,000 ft. or more) and moisture protection as it requires a very wide opening on the bottom of the aircraft. Such a wide opening not only causes structural problems for the aircraft, but also is a challenge of mounting to the convex shape of the aircraft. Hence a tall narrow device such as the radar altimeter described herein permits mounting on a convex surface of modest curvature and creates a smaller structural challenge.

Additionally, the shape of the package enables the radar altimeter system 10 to fit within a re-enforcement structure (stringers and frames) of the fuselage. Specifically, newer class aircraft use stringers that are narrowly spaced. The package of the altimeter is designed to avoid cutting away any stringer or frames to allow installation. This reduces the cost of integration of the radar altimeter system 10 and achieves a large weight saving by eliminating the need to add "sister" structure stringers and frames that would otherwise have been cut away to make room for the altimeter environmental cover and connector. Thus, the aspect ratio and the height of the package have been set such that the radar altimeter system 10 will fit on a large number of aircraft fuselages with little impact to the fuselage structure.

EXAMPLE EMBODIMENTS

Example 1 includes a method for operating a radar altimeter, the method comprising: transmitting a radar signal at a first frequency for a first length of time; ramping the frequency of the radar signal from the first frequency to a second frequency; transmitting the radar signal at the second frequency for a second length of time; receiving reflections of the radar signal; processing the reflections by: determining an approximate distance to a target from which the reflections are received based on an amount of time between transmission of the radar signal having the frequency ramp and reception of a reflection of the radar signal having the frequency ramp; determining a first phase of a reflection of the radar signal transmitted at the first frequency, wherein the first phase is the phase of the radar signal as received; determining a second phase of a reflection of the radar signal transmitted at the second frequency, wherein the second phase is the phase of the radar signal as received; calculating a phase difference between the first phase and the second phase; and refining the approximate distance to the target based on the phase difference between the first phase and the second phase.

Example 2 includes the method of Example 1, wherein ramping the frequency starts immediately after modulating the radar signal at a first frequency and wherein modulating the radar signal at a second frequency occurs immediately after reaching the second frequency during the ramping of the frequency.

Example 3 includes the method of Example 2, comprising: repeatedly transmitting the radar signal at the first frequency, ramping the frequency from the first frequency to the second frequency, and transmitting the radar signal at the second frequency.

Example 4 includes the method of any of Examples 1-3, wherein determining an approximate distance includes determining a fast Fourier transform (FFT) bin to which the reflection corresponds; and wherein refining the approximate distance includes refining the approximate distance if the reflection of the frequency ramp corresponds to a distance equal to or less than the distance of the center of the first FFT bin and not refining the approximate distance if the reflection of the frequency ramp corresponds to a distance greater than the center of the first FFT bin.

Example 5 includes the method of any of Examples 1-4, wherein determining a first phase includes calculating an inverse tangent function on an imaginary value divided by a real value in the zero IF FFT bin of the reflected signal of the first frequency; and wherein determining a second phase includes calculating an inverse tangent function on an imaginary value divided by a real value in the zero IF FFT bin of the reflected signal of the second frequency.

Example 6 includes the method of any of Examples 1-5, wherein the first length of time is greater than 0.5 ms and the second length of time is greater than 0.5 ms.

Example 7 includes the method of any of Examples 1-6, wherein refining the approximate distance includes calculate a refined distance as equal to the phase difference divided by 360 degrees and multiplied by the maximum unambiguous distance, where the maximum unambiguous distance equals the speed of light divided by two times the frequency difference between the first frequency and the second frequency.

Example 8 includes a frequency modulated continuous wave (FMCW) radar comprising: a transmitter configured to: transmit a radar signal at a first frequency for a first length of time; ramp the frequency of the radar signal from the first frequency to a second frequency; transmit the radar signal at the second frequency for a second length of time; and a receiver configured to: receive reflections of the radar signal; and process the reflections by: determine an approximate distance to a target from which the reflections are received based on an amount of time between transmission of the radar signal having the frequency ramp and reception of a reflection of the radar signal having the frequency ramp; determine a first phase of a reflection of the radar signal transmitted at the first frequency, wherein the first phase is the phase of the radar signal as received; determine a second phase of a reflection of the radar signal transmitted at the second frequency, wherein the second phase is the phase of the radar signal as received; calculate a phase difference between the first phase and the second phase; and refine the approximate distance to the target based on the phase difference between the first phase and the second phase.

Example 9 includes the FMCW radar of Example 8, comprising: a single antenna coupled to the transmitter and the receiver.

Example 10 includes the FMCW radar of Example 9, wherein the single antenna is integrated in a housing with the transmitter and receiver and there is less than a 2 cm signal distance between the single antenna and a circulator that couples signals between the single antenna, the transmitter, and the receiver.

Example 11 includes the FMCW radar of any of Examples 8-10, wherein ramp the frequency starts immediately after transmit the radar signal at a first frequency and wherein transmit the radar signal at a second frequency occurs immediately after reaching the second frequency during the ramp of the frequency.

Example 12 includes the FMCW radar of Example 11, wherein the transmitter is configured to: repeatedly transmit the radar signal at the first frequency, ramp the frequency from the first frequency to the second frequency, and transmit the radar signal at the second frequency.

Example 13 includes the FMCW radar of any of Examples 8-12, wherein determine an approximate distance includes determine a fast Fourier transform (FFT) bin to which the reflection corresponds; and wherein refine the approximate distance includes refine the approximate distance if the reflection of the frequency ramp corresponds to a distance equal to or less than the distance of the center of the first FFT bin and not refine the distance if the reflection of the frequency ramp corresponds to a distance greater than the center of the first FFT bin.

Example 14 includes the FMCW radar of any of Examples 8-14, wherein determine a first phase includes calculate an inverse tangent function on an imaginary value divided by a real value in the zero IF FFT bin of the reflected signal of the first frequency; and wherein determine a second phase includes calculate an inverse tangent function on an imaginary value divided by a real value in the zero IF FFT bin of the reflected signal of the second frequency.

Example 15 includes the FMCW radar of any of Examples 8-14, wherein the first length of time is greater than 0.5 ms and the second length of time is greater than 0.5 ms.

Example 16 includes the FMCW radar of any of Examples 8-15, wherein refine the approximate distance includes calculate a refined distance as being equal to the phase difference divided by 360 degrees and multiplied by the maximum unambiguous distance, where the maximum unambiguous distance equals the speed of light divided by two times the frequency difference between the first frequency and the second frequency.

Example 17 includes a method for operating a radar altimeter, the method comprising: ramping a frequency of a radar signal from a first frequency to a second frequency; receiving a reflection of the radar signal having the frequency ramp; determining an approximate distance to a target from which the reflections are received based on an amount of time between transmission of the radar signal having the frequency ramp and reception of a reflection of the radar signal having the frequency ramp; if the approximate distance is less than or equal to a distance corresponding to a center of a first FFT bin, then: transmitting the radar signal at a first frequency for a first length of time; transmitting the radar signal at the second frequency for a second length of time; receiving reflections of the radar signal transmitted at the first frequency and the second frequency; and processing the reflections by: determining a first phase of a reflection of the radar signal transmitted at the first frequency, wherein the first phase is the phase of the radar signal as received; determining a second phase of a reflection of the radar signal transmitted at the second frequency, wherein the second phase is the phase of the radar signal as received; calculating a phase difference between the first phase and the second phase; and refining the approximate distance to the target based on the phase difference between the first phase and the second phase.

Example 18 includes the method of Example 17, wherein determining a first phase includes calculating an inverse tangent function on an imaginary value divided by a real value in the zero IF FFT bin of the reflected signal of the first frequency; and wherein determining a second phase includes calculating an inverse tangent function on an imaginary value divided by a real value in the zero IF FFT bin of the reflected signal of the second frequency.

Example 19 includes the method of any of Examples 17 or 18, wherein the first length of time is greater than 0.5 ms and the second length of time is greater than 0.5 ms.

Example 20 includes the method of any of Examples 17-19, wherein refining the approximate distance includes calculate a refined distance as equal to the phase difference divided by 360 degrees and multiplied by the maximum unambiguous distance, where the maximum unambiguous distance equals the speed of light divided by two times the frequency difference between the first frequency and the second frequency.

What is claimed is:

1. A method for operating a radar altimeter, the method comprising:
    generating a linear frequency ramp of a radar signal from a first frequency to a second frequency for one modulation period;
    receiving reflection of the frequency ramp of the radar signal;
    processing the reflection by determining an approximate distance to a target from which the reflections are received based on an amount of time between transmission of the radar signal having the frequency ramp and reception of the reflection of the radar signal having the frequency ramp, wherein the approximate distance is proportional to frequency difference between received reflections of the frequency ramp and generated linear frequency ramp, and wherein the approximate distance to a target is determined with a resolution based on a distance separating center points of neighboring fast fourier transform (FFT) bins in the radar altimeter; and
    when the approximate distance is less than or equal to a maximum unambiguous distance:
    transmitting a first radar signal having a first frequency for a first length of time;
    receiving a reflection of the first radar signal at the first frequency;
    transmitting a second radar signal having a second frequency for a second length of time;
    receiving a reflection of the second radar signal at the second frequency; and
    processing the reflections of the first radar signal and the second radar signal at the first and second frequency by:
        determining a first phase of a reflection of the first radar signal transmitted at the first frequency, wherein the first phase is the difference in phase between phase of a sample of transmitted first radar signal at the first frequency and phase of the reflection of the first radar signal as received at the first frequency;
        determining a second phase of a reflection of the radar signal transmitted at the second frequency, wherein the second phase is the difference in phase between phase of a sample of transmitted second radar signal at the second frequency and phase of the reflection of the second radar signal as received at the second frequency;
        calculating a phase difference between the first phase and the second phase; and
        refining the approximate distance to the target based on the phase difference between the first phase and the second phase, wherein refining the approximate distance includes calculating a refined distance based on the phase difference divided by 360 degrees and multiplied by the maximum unambiguous distance, where the maximum unambiguous distance equals the speed of light divided by two times the frequency difference between the first frequency and the second frequency.

2. The method of claim 1, further comprising:
    modulating the radar signal at the first frequency; and
    modulating the radar signal at the second frequency;
    wherein generating a frequency ramp starts immediately after modulating the radar signal at the first frequency and wherein modulating the radar signal at the second frequency occurs immediately after reaching the second frequency during generating a frequency ramp.

3. The method of claim 2, comprising:
    repeatedly transmitting the radar signal at the first frequency, generating a frequency ramp from the first frequency to the second frequency, and transmitting the radar signal at the second frequency.

4. The method of claim 1,
    wherein refining the approximate distance includes refining the approximate distance if the reflection of the frequency ramp corresponds to a distance equal to or less than the distance of the center of the first FFT bin and not refining the approximate distance if the reflection of the frequency ramp corresponds to a distance greater than the center of the first FFT bin.

5. The method of claim 1, wherein determining a first phase includes calculating an inverse tangent function on an imaginary value divided by a real value in the zero IF FFT bin of the reflected signal of the first frequency; and
wherein determining a second phase includes calculating an inverse tangent function on an imaginary value divided by a real value in the zero IF FFT bin of the reflected signal of the second frequency.

6. The method of claim 1, wherein the first length of time is at least 0.5 ms and the second length of time is at least 0.5 ms.

7. A frequency modulated continuous wave (FMCW) radar comprising:
a transmitter configured to:
transmit a first radar signal at a first frequency for a first length of time;
generate a frequency ramp to ramp the frequency of a radar signal from the first frequency to a second frequency;
transmit a second radar signal at the second frequency for a second length of time; and
a receiver configured to:
receive reflections of the radar signals; and
process the reflections by determining an approximate distance to a target from which the reflections are received based on an amount of time between transmission of the radar signal having the frequency ramp and reception of a reflection of the radar signal having the frequency ramp, wherein the approximate distance is proportional to frequency difference between received reflections of the frequency ramp and generated linear frequency ramp, and wherein the approximate distance to a target is determined with a resolution based on a distance separating center points of neighboring of fast fourier transform (FFT) bins in the radar altimeter; and
when the approximate distance is less than or equal to a maximum unambiguous distance, processing the reflections further by:
determine a first phase of a reflection of the first radar signal transmitted at the first frequency, wherein the first phase is the difference in phase between phase of a sample of transmitted first radar signal at the first frequency and phase of reflection of the first radar signal as received at the first frequency;
determine a second phase of a reflection of the radar signal transmitted at the second frequency, wherein the second phase is the difference in phase between phase of a sample of transmitted radar signal at the second frequency and phase of the reflection of the second radar signal as received at the second frequency;
calculate a phase difference between the first phase and the second phase; and
refine the approximate distance to the target based on the phase difference between the first phase and the second phase, wherein refine the approximate distance includes calculate a refined distance based on the phase difference divided by 360 degrees and multiplied by the maximum unambiguous distance, where the maximum unambiguous distance equals the speed of light divided by two times the frequency difference between the first frequency and the second frequency.

8. The FMCW radar of claim 7, comprising:
a single antenna coupled to the transmitter and the receiver.

9. The FMCW radar of claim 8 wherein the single antenna is integrated in a housing with the transmitter and receiver and there is less than a 2 cm signal distance between the single antenna and a circulator that couples signals between the single antenna, the transmitter, and the receiver.

10. The FMCW radar of claim 7, wherein generate the frequency ramp starts immediately after transmit the radar signal at a first frequency and wherein transmit the radar signal at a second frequency occurs immediately after reaching the second frequency during the ramp of the frequency.

11. The FMCW radar of claim 10, wherein the transmitter is configured to:
repeatedly transmit the radar signal at the first frequency, ramp the frequency from the first frequency to the second frequency, and transmit the radar signal at the second frequency.

12. The FMCW radar of claim 7,
wherein refine the approximate distance includes refine the approximate distance if the reflection of the frequency ramp corresponds to a distance equal to or less than the distance of the center of the first FFT bin and not refine the distance if the reflection of the frequency ramp corresponds to a distance greater than the center of the first FFT bin.

13. The FMCW radar of claim 7, wherein determine a first phase includes calculate an inverse tangent function on an imaginary value divided by a real value in the zero IF FFT bin of the reflected signal of the first frequency; and
wherein determine a second phase includes calculate an inverse tangent function on an imaginary value divided by a real value in the zero IF FFT bin of the reflected signal of the second frequency.

14. The FMCW radar of claim 7, wherein the first length of time is at least 0.5 ms and the second length of time is at least 0.5 ms.

15. A method for operating a radar altimeter, the method comprising:
transmitting a radar signal;
generating a frequency ramp of a radar signal from a first frequency to a second frequency;
receiving a reflection of the radar signal having the frequency ramp;
determining an approximate distance to a target from which the reflections are received based on an amount of time between transmission of the radar signal having the frequency ramp and reception of a reflection of the radar signal having the frequency ramp, wherein the approximate distance is proportional to frequency difference between received reflection of the frequency ramp and generated linear frequency ramp; and if the approximate distance is less than or equal to a distance corresponding to a center of a first FFT bin, then:
transmitting a first radar signal at the first frequency for a first length of time;
transmitting a second radar signal at the second frequency for a second length of time;
receiving reflections of the first and the second radar signals transmitted at the first frequency and the second frequency; and
processing the reflections by:
determining a first phase of a reflection of the first radar signal transmitted at the first frequency, wherein the first phase is the difference in phase between phase of a sample of transmitted first radar signal at the first frequency and the phase of the reflection of the first radar signal as received at the first frequency;

determining a second phase of a reflection of the second radar signal transmitted at the second frequency, wherein the second phase is the difference in phase between phase of a sample of transmitted radar signal at the second frequency and the phase of the reflection of the second radar signal as received at the second frequency;

calculating a phase difference between the first phase and the second phase; and refining the approximate distance to the target based on the phase difference between the first phase and the second phase, wherein refining the approximate distance includes calculating a refined distance based on the phase difference divided by 360 degrees and multiplied by the maximum unambiguous distance, where the maximum unambiguous distance equals the speed of light divided by two times the frequency difference between the first frequency and the second frequency.

16. The method of claim 15, wherein determining a first phase includes calculating an inverse tangent function on an imaginary value divided by a real value in the zero IF FFT bin of the reflected signal of the first frequency; and wherein determining a second phase includes calculating an inverse tangent function on an imaginary value divided by a real value in the zero IF FFT bin of the reflected signal of the second frequency.

17. The method of claim 15, wherein the first length of time is at least 0.5 ms and the second length of time is at least 0.5 ms.

* * * * *